(12) United States Patent
Chamseddine et al.

(10) Patent No.: US 8,161,223 B1
(45) Date of Patent: *Apr. 17, 2012

(54) METHOD AND SYSTEM FOR A STORAGE DEVICE

(75) Inventors: Ahmad Chamseddine, Round Rock, TX (US); Brian Bruce, Austin, TX (US)

(73) Assignee: Augmentix Corporation, Austin, TX (US)

( * ) Notice: Subject to any disclaimer, the term of this patent is extended or adjusted under 35 U.S.C. 154(b) by 133 days.

This patent is subject to a terminal disclaimer.

(21) Appl. No.: 12/048,271

(22) Filed: Mar. 14, 2008

Related U.S. Application Data

(60) Provisional application No. 60/961,605, filed on Jul. 23, 2007.

(51) Int. Cl.
*G06F 13/36* (2006.01)
(52) U.S. Cl. .......... 710/315; 710/310; 711/202
(58) Field of Classification Search .......... 710/315, 710/310; 711/202
See application file for complete search history.

(56) References Cited

U.S. PATENT DOCUMENTS

| | | | |
|---|---|---|---|
| 5,708,668 A * | 1/1998 | Styczinski | 714/6 |
| 6,834,324 B1 * | 12/2004 | Wood | 711/111 |
| 6,973,516 B1 * | 12/2005 | Athanas et al. | 710/100 |
| 7,107,385 B2 * | 9/2006 | Rajan et al. | 711/4 |
| 7,213,095 B2 | 5/2007 | Middleton | |
| 7,472,219 B2 | 12/2008 | Tamura | |
| 7,913,025 B1 | 3/2011 | Chamseddine et al. | |
| 7,917,683 B1 | 3/2011 | Chamseddine et al. | |
| 2002/0194428 A1 * | 12/2002 | Green | 711/114 |
| 2004/0123017 A1 * | 6/2004 | Henry et al. | 711/6 |
| 2005/0010722 A1 * | 1/2005 | Chen | 711/114 |
| 2005/0066138 A1 * | 3/2005 | Horn et al. | 711/158 |
| 2005/0125602 A1 | 6/2005 | Ehrlich | |
| 2005/0125603 A1 | 6/2005 | Ehrlich | |
| 2005/0132040 A1 * | 6/2005 | Ellis et al. | 709/223 |
| 2005/0157752 A1 * | 7/2005 | Takase et al. | 370/468 |
| 2006/0047675 A1 * | 3/2006 | Lowe et al. | 707/101 |
| 2006/0224852 A1 * | 10/2006 | Kottomtharayil et al. | 711/170 |
| 2006/0248292 A1 * | 11/2006 | Suresh | 711/154 |
| 2007/0074292 A1 * | 3/2007 | Mimatsu | 726/26 |
| 2007/0250662 A1 | 10/2007 | Yoshida | |
| 2009/0125678 A1 * | 5/2009 | Tokuda et al. | 711/114 |
| 2010/0070688 A1 | 3/2010 | Lin | |

OTHER PUBLICATIONS

Office Action issued in U.S. Appl. No. 12/048,256 dated Dec. 22, 2009, 9 pages.
Office Action issued in U.S. Appl. No. 12/175,490, mailed Mar. 31, 2010, 8 pgs.
Office Action issued in U.S. Appl. No. 12/175,496 mailed Apr. 1, 2010, 12 pgs.
Office Action for U.S. Appl. No. 12/175,490 mailed Aug. 19, 2010, 6 pgs.

(Continued)

*Primary Examiner* — Mark Rinehart
*Assistant Examiner* — Nimesh G Patel
(74) *Attorney, Agent, or Firm* — Sprinkle IP Law Group

(57) ABSTRACT

Systems and methods for storage devices are presented. More specifically, in one embodiment a storage device may comprise have an enclosure comprising an interface which may be coupled to an I/O bus of a computing system with which it is being utilized. Commands may be received through the interface and, invisibly to the computing system which issues the commands, translated into a set of commands configured to effectuate the received command in conjunction with one or more storage media coupled to the interface, where this set of commands may also be configured to implement additional functionality such as RAID or data encryption in conjunction with the storage media.

20 Claims, 5 Drawing Sheets

OTHER PUBLICATIONS

Office Action for U.S. Appl. No. 12/175,496 mailed Aug. 19, 2010, 6 pgs.
Office Action for U.S. Appl. No. 12/048,256 mailed Sep. 2, 2010, 12 pgs.
Notice of Allowance for U.S. Appl. No. 12/175,490, mailed Jan. 10, 2011, 6 pgs.
Notice of Allowance for U.S. Appl. No. 12/175,496 mailed Jan. 20, 2011, 6 pgs.
Office Action for U.S. Appl. No. 12/048,256 mailed Feb. 2, 2011, 10 pgs.
Office Action for U.S. Appl. No. 12/048,256 mailed Jul. 27, 2011, 14 pgs.
Notice of Allowance for U.S. Appl. No. 12/048,256 mailed Dec. 14, 2011, 13 pgs.

* cited by examiner

METHOD AND SYSTEM FOR A STORAGE DEVICE

RELATED APPLICATIONS

This application claims a benefit of priority to the filing date of U.S. Provisional Patent Application Ser. No. 60/961,605 by Brian Bruce and Ahmad Chamseddine, entitled "Method and System for RAID Implementation" filed on Jul. 23, 2007, the entire contents of which are hereby expressly incorporated by reference for all purposes.

TECHNICAL FIELD

Embodiments of the invention relate generally to storage devices. More particularly, embodiments of the invention relate to implementing storage devices with increased capacity, speed, security, a more desirable form factor, or another objective altogether.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business, legal or other purposes, many entities may desire to protect their data using a variety of techniques, including data storage, redundancy, security, etc. These techniques may, however, conflict with other competing constraints or demands imposed by the state or configuration of computing devices used to process or store this data.

These types of constraints may center around processing constraints particular to an environment or context in which data is being processed or utilized, space constraints within such an environment, cost constraints placed on the hardware or software used to process, manage or otherwise store data, or other constraints altogether may impede the ability to achieve desirable levels of protection with respect to important data. It would be desirable therefore, to be able to achieve a desired level of data protection utilizing solutions which may account for, or be less affected by, certain of these constraints.

SUMMARY

Systems and methods for storage devices are presented. More specifically, in one embodiment a storage device may comprise have an enclosure comprising an interface which may be coupled to an I/O bus of a computing system with which it is being utilized. Commands may be received through the interface and, invisibly to the computing system which issues the commands, translated into a set of commands configured to effectuate the received command in conjunction with one or more storage media coupled to the interface, where this set of commands may also be configured to implement additional functionality such as RAID or data encryption in conjunction with the storage media.

Embodiments of the invention disclosed herein can be implemented all or in part by logic, including hardware or by programming one or more computer systems or devices with computer-executable instructions embodied in a computer-readable medium. When executed by a processor, these instructions operate to cause these computer systems and devices to perform one or more functions particular to embodiments of the invention disclosed herein. Programming techniques, computer languages, devices, and computer-readable media necessary to accomplish this are known in the art and thus will not be further described herein.

Certain technical advantages may be obtained through the use of embodiments of the present invention. More specifically, embodiments of the present invention may be operating system and bus agnostic, any bus can be utilized and RAID, security, extra capacity, etc. can be implemented or obtained regardless of a native bus format with which the storage device is being utilized. Thus, the functionality provided by embodiments of the present invention may be obtained without modification to drivers or other software on native systems and without the addition of a separate RAID controller.

Furthermore, embodiments of the present invention may allow increased throughput by allowing multiple storage media to be utilized in conjunction with certain buses (where only one drive or storage media may have been utilized previously) to minimize latency on the bus and maximize throughput.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented at least in part using suitable computer-executable instructions that may reside on a computer readable medium (e.g., a HD), hardware circuitry or the like, or any combination. Before proceeding with the remainder of the disclosure it may be helpful to review U.S. application Ser. No. 12/048,256, entitled "Method and System and Apparatus for Use in Data Storage" by Brian Bruce and Ahmad Chamseddine, filed Mar. 14, 2008, the entire contents of which are incorporated fully herein by reference.

As discussed above, data represents a significant asset for many entities. Consequently, data loss, whether accidental or caused by malicious activity, can be costly in terms of wasted manpower, loss of goodwill from customers, loss of time and potential legal liability. To ensure proper protection of data for business, legal or other purposes, many entities may desire to protect their data using a variety of techniques, including data storage, redundancy, security, etc. These techniques may, however, conflict with other competing constraints or demands imposed by the state or configuration of computing devices used to process or store this data.

Figure 1:
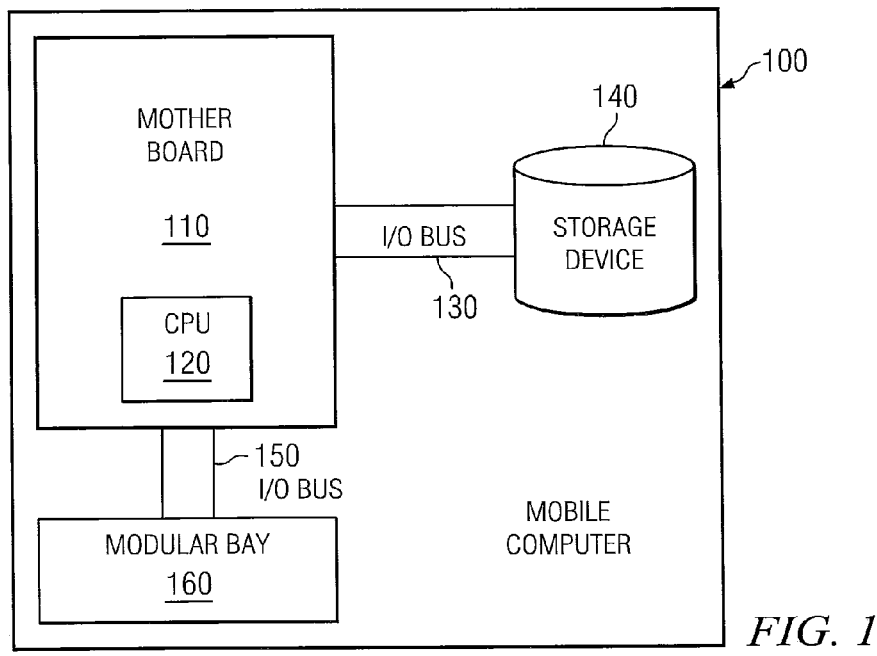
FIG. 1 is a block diagram of one embodiment of a mobile computer.

This tension may be better understood with reference to FIG. 1 which depicts a high level overview of one embodiment of an architecture for a mobile computer (e.g. also sometimes referred to as a notebook or laptop computer). A mobile computer 100 comprises a mother board 110 with a Central Processing Unit (CPU) 120 where the mother board is coupled to a storage device 140 (e.g. a hard disk drive, solid state storage such as flash memory or the like, media library of tape drives, other type of storage media such as disk platters, etc., the terms storage device and storage media will be used interchangeably throughout) through an I/O bus 130 (e.g. an ATA bus, such as a SATA or PATA bus, a PCI bus, a SCSI bus or any other type of bus). Thus, data processed by, or otherwise utilized in conjunction with, mobile computer 100 may be stored in storage device 140.

However, storage device 140 may only be of a certain capacity. In other words current technical limitations of the storage device may only allow a particular type of storage device 140 to store a certain amount of data (referred to as the capacity of the storage device). For example, the largest capacity hard disk drive may be around 750 gigabytes. Part and parcel with this limitation, the capacity of storage device 140 may further be limited by the physical constraints imposed by the packaging of mobile computer 100. There may only be a limited amount of space in which to place storage device 140. In many cases, this additional limitation further constrains the capacity of storage device 140 which may be utilized in this physical package (as the physical size of a storage device may be related to its capacity). For example, the largest disk drive that is currently in use in mobile computers is around 160 gigabytes.

Consequently, the amount of data which may be stored in conjunction with mobile computer 100 is limited by the capacity of storage device 140. This limitation exists, in part, because in most cases I/O bus 130 may only allow (e.g. is configured or designed to operate with) one storage device to be coupled to the I/O bus 130. Thus, the capacity of storage device 140 (which itself may be constrained by technological limitations or the physical limitations imposed by the packaging of mobile computer 100) may be the biggest gating factor in the amount of data which may be stored by mobile computer 100.

Mobile computer 100 may, however, also comprise a second I/O Bus 150 coupled to mother board 110, where the second I/O Bus 150 interfaces with a modular bay 160. A variety of devices may be inserted into (e.g. interfaced with), or used in conjunction with, modular bay 160. For example, a CD or DVD drive may be utilized in conjunction with modular bay 160, a floppy disk drive or another type of storage device such as a hard disk or the like may also be utilized in conjunction with modular bay 160. Consequently, in order to expand the amount of data which may be stored in conjunction with mobile computer 100, in many cases modular bay 160 may be utilized in conjunction with a second storage device in addition to storage device 140. Utilizing the modular bay 160 of mobile computer 100 may, however, preclude the use of modular bay 160 for interfacing with another desired device (e.g. DVD or CD drive), may entail constant swapping between the second storage device and another desired device and may require a user to carry multiple additional devices.

Figure 2:
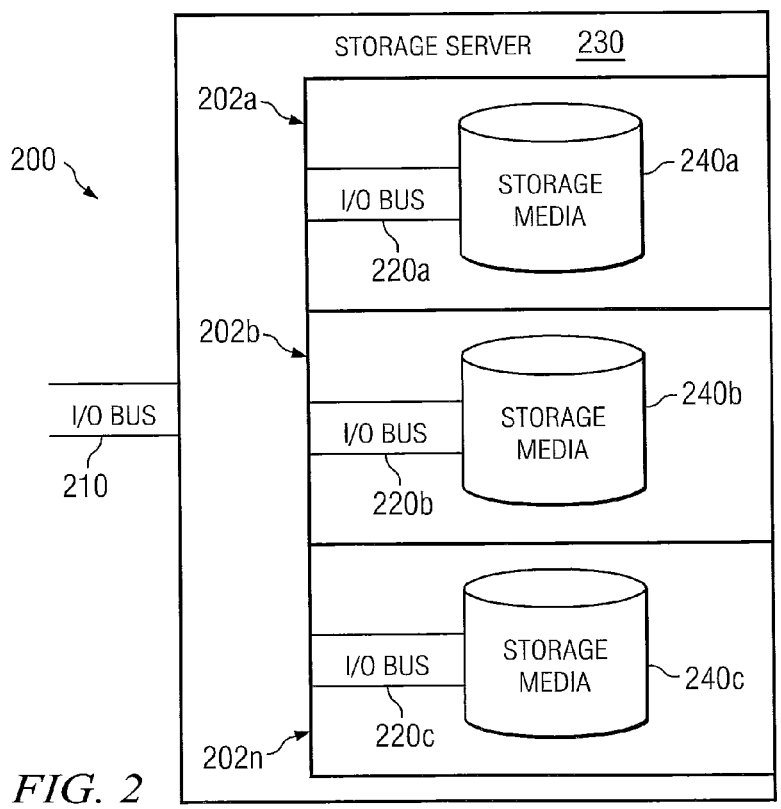
FIG. 2 is a block diagram of one embodiment of a storage server.

Similar types of problems may present themselves in other computing devices or systems which utilize storage devices, such as enterprise servers, storage servers, storage area networks (SANs), network attached storage (NAS) systems, or the like. These types of problems may be better illustrated with reference to FIG. 2 which depicts a block diagram of one embodiment of a computer storage system. Storage system 200 comprises a storage server 230 which receives commands or instructions over I/O bus 210, which may be a type of serial bus such as fiber channel, SCSI or the like, but may also be any type of I/O bus known in the art. Based on the commands or instructions received over I/O bus 210, storage server 230 may communicate with one or more of storage devices 240 (e.g. hard disk drives, tape drives, optical drives, solid state storage devices, etc.) to write, read or otherwise operate on, data associated with those storage devices 240. These communications may take over an I/O bus 220 corresponding to the storage device 240, where each of these I/O buses 220, may in turn, be different, for example I/O bus 220a may be a SCSI bus, I/O Bus 220b may be a serial ATA bus, etc.

In most cases, however, no matter the type of I/O bus utilized, the I/O bus 220 may limited to being coupled only to one storage device 240 or type of storage device 230 (e.g. a storage device may comprise multiple physical tape drives or other storage mediums). As can be seen, this limitation may constrain the storage associated with storage server 230 to the number of I/O buses 220 associated with storage router 230 and the type and size of storage devices 240 associated with each of I/O buses 220.

Exacerbating these limitations is the fact that, in some cases, storage devices 240 may be proprietary to a particular manufacturer of storage server 230. This is because storage server 230 may be designed such that is has one or more slots 202 into which storage device 240 may be inserted, plugged or otherwise connected. As storage servers 230 may be designed for a variety of goals or objectives, different storage servers may have different designs and thus the slots 202 into which storage media 240 may be plugged may be different. These types of storage devices 240 are sometimes referred to as field replaceable units (FRU) or the like.

In most cases, then, manufactures design proprietary enclosures for storage device 240, such that the storage device 240 comprises a proprietary enclosure housing one or more storage media (such as a hard disk of the type known in the art such as those manufactured by Seagate, Western Digital, Samsung, etc.). These storage devices 240 can then be utilized in conjunction with a storage server 230 from the same manufacturer. Thus, once again a limiting factor is the capacity of storage devices 240 designed for that storage server (e.g. utilizing an enclosure compatible with the storage server 230).

To remedy the aforementioned deficiencies, problems and limitations, among others, attention is now directed to systems, methods and apparatuses for storage device which have improved capacity, speed, security, a more desirable form factor or myriad other advantages relative to other storage devices. More specifically, embodiments of such storage devices may interface with a single bus (e.g. a single point of connection to a bus) and allow this single bus to be interfaced with multiple buses invisibly to devices using the single bus. By allowing multiple buses to be interfaced to the single bus, a number of storage media may be coupled to each of the buses, greatly increasing the maximum storage capacity, speed, etc. relative to the coupling of a storage device with only a single storage media to the single bus, without using any additional buses or slots (e.g. in a storage server or on a bus).

Advantageously, in one embodiment, these capabilities may be obtained without alterations to any of the other hardware or software of systems with which it utilized, and to that hardware or software the single storage device comprising the multiple buses (and multiple attached storage media) may appear as a single storage device on the bus. For example, using an embodiment of the systems, methods and devices presented herein, a single storage device comprising multiple storage media such as hard disk drives or the like may be utilized in a mobile computer without changing the BIOS of the mobile computer where the single storage device may appear as a single volume to the operating system of the mobile computer.

Figure 3:
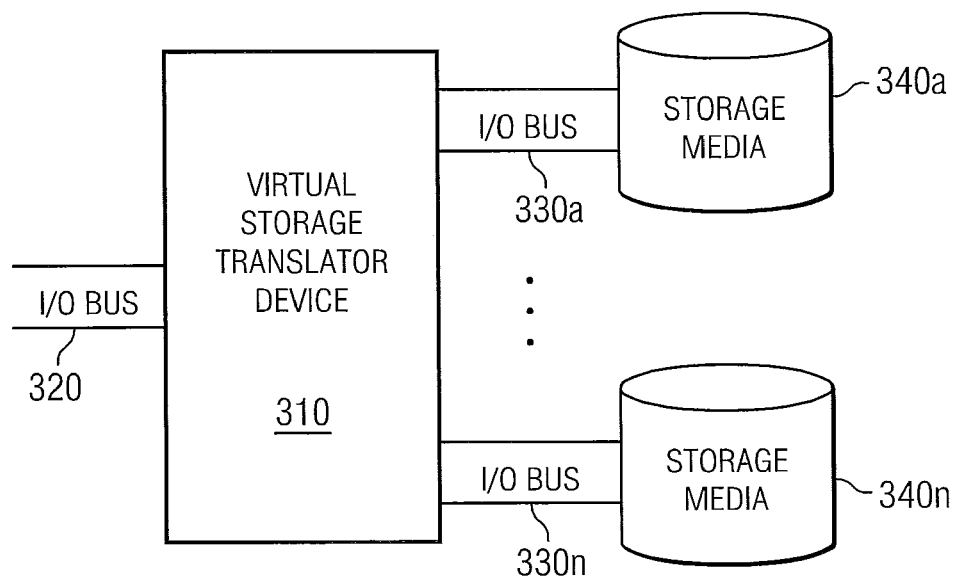
FIG. 3 is a block diagram of one embodiment of a virtual translator storage device.

Moving now to FIG. 3, a block diagram for one embodiment of a system for interfacing multiple buses with a single bus is depicted. More specifically, virtual storage translator device 310 may allow a primary I/O bus 320 to be interfaced with multiple secondary I/O buses 330. I/O bus 320 may be almost any type of bus known in the art, such a SATA or PATA bus. Virtual storage translator device 310, may be a standalone ASIC, a field programmable gate array (FPGA), a circuit board comprising one or more ASICs operable to execute computer readable instructions, a set of computer readable instructions, some combination of hardware and software, etc. In one embodiment, virtual storage translator device 310 may use one or more ASICs such as the Silicon Image Si5723 Storage Processor.

This virtual storage translator device 310 is operable to receive commands or instructions (used interchangeably herein) on primary I/O bus 320 and translate or map these commands or instructions such that they are effectuated with respect to storage media 340 on secondary I/O buses 330, where secondary I/O buses 350 may each be a different type of I/O bus (e.g. SATA, PATA, SCSI, FC, etc.) and secondary I/O buses 330 may be the same or different from primary I/O bus 320. This translator or mapping may for example, entail tracking where various files are stored or translating commands or instructions in one protocol to equivalent commands or instructions in another protocol.

Furthermore, this translator or mapping process may be accomplished seamlessly or invisibly with respect to a computing device or processor which issues the commands or instruction over I/O bus 320. In other words, in some embodiments, to a computing device interfacing with I/O bus 320 it appears as if a single storage device is present on I/O bus 320 where this single storage device may have the capacity of the combined capacity of the storage media 340 coupled to each of I/O buses 330.

In addition to providing the advantages detailed above, such as increased capacity, speed, form factor etc. embodiments of the virtual translator storage device may provide additional functionality. Specifically, in one embodiment, a virtual translator storage device may provide one or more Redundant Array of Independent Drives (RAID) implementations. While a virtual translator storage device may be utilized to implement RAID in a variety of settings, a RAID implementation may be particularly useful in a mobile computing environment as previously it was only possible to implement software RAID on mobile computers, which imposed a significant impact on both the performance and reliability of the mobile computers on which it was implemented.

By utilizing a RAID controller in conjunction with an embodiment of a virtual translator storage device RAID functionality may be implemented invisibly with respect to the system with which it is utilized. In other words, other hardware or software (such as the BIOS or operating system) of the system on which RAID is implemented need not be altered to implement this RAID functionality.

Figure 4:
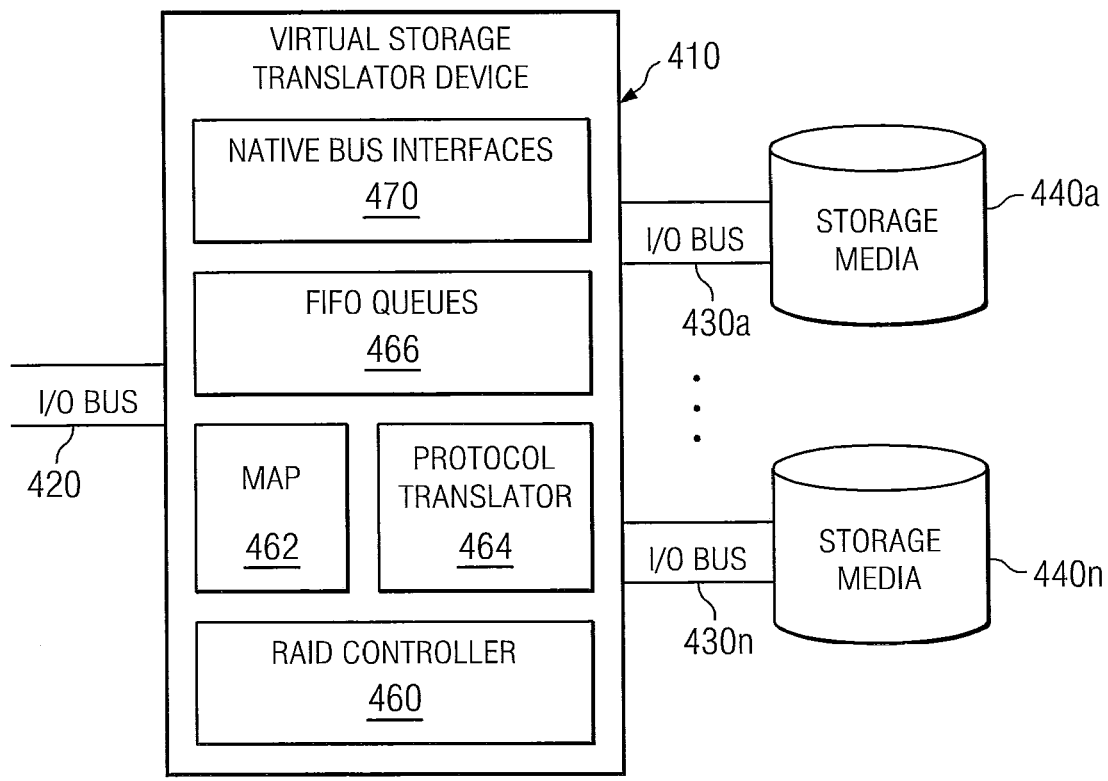
FIG. 4 is a block diagram of one embodiment of a virtual translator storage device.

Moving now to FIG. 4, a block diagram for one embodiment of a system for interfacing multiple buses with a single bus is depicted, where RAID may be implemented with respect to storage devices on these multiple buses. More specifically, virtual storage translator device 410 may allow a primary I/O bus 420 to be interfaced with multiple secondary I/O buses 430. I/O bus 420 may be almost any type of bus known in the art, such a serial, SATA or PATA bus. Virtual storage translator device 410, includes RAID controller 460 which may be hardware (e.g. on an ASIC), a portion of the hardware or ASIC comprising virtual storage translator device 610, computer readable instructions on a computer readable media, or some combination. RAID controller 460 may be operable to implement one or more RAID levels (e.g. RAID levels 0, 1, 3, 4, 5, 6 or any nested RAID levels, etc.), multi-RAID modes (e.g. implementations which create virtual volumes and balance the benefits of capacity and protection) cascaded storage devices and the like. In other words, in one embodiment, RAID controller 460 handles the management of the storage media coupled to secondary I/O buses 430, performing any parity calculations required by an implemented level RAID level or executing other processing utilized for the RAID implementation.

This management may, in one embodiment, include maintaining one or more first in first out (FIFO) queues 666 for buffering or holding received commands until they are processed and map 462 which is a map between the addressing utilizing in conjunction with commands issued over I/O bus 420 and the storage of data with respect to storage media 440. For example, if RAID controller is implementing RAID 0 with respect to storage media 440, all of storage media 440 may appear as one contiguous set of addresses to users of I/O bus 420 and thus commands over I/O bus 420 may attempt to store or otherwise access data according to these contiguous addresses. To implement RAID 0, however, this data may be stored in storage media according to a different addressing scheme or at different locations than those referred to by command received over I/O bus 420. Thus, map 462 may correlate or otherwise associate addresses or locations of the type or format received over I/O bus 420 with addresses or locations in one or more of storage media 440.

Thus, virtual storage translator device 410 may be operable to receive commands or instructions on primary I/O bus 420 and translate these commands or instructions such that they are effectuated with respect to storage media 440 on secondary I/O buses 430 or to receive responses or data on a secondary I/O bus 430 and translate the response or data such that it can be communicated to a recipient (e.g. issuer of a command) on primary I/O bus 420, where secondary I/O buses 430 may each be a different type of I/O bus (e.g. SATA, PATA, SCSI, FC, etc.) and secondary I/O buses 430 may be the same or different from primary I/O bus 420. The translation of these commands or responses from the protocol in which they are received on a bus (e.g. primary I/O bus 420 or a secondary I/O bus 430) to a suitable protocol may be accomplished by using native bus interfaces 470 (e.g. an interface corresponding to primary I/O bus 420 or one or more of secondary I/O buses 430) and protocol translator 464.

Additionally, virtual storage translator device 410 is operable to implement a RAID scheme with respect to these commands or instructions and the data stored on storage media 440 coupled to secondary I/O buses 430. Both this translator process and the implementation of a RAID scheme may be accomplished seamlessly or invisibly with respect to a computing device or processor which issues the commands or instruction over I/O bus 420. In other words, in some embodiments, to a computing device interfacing with I/O bus 420 it appears as if a single storage device is present on I/O bus 420 irrespective of the implementation of the RAID scheme implemented. Portions of the functionality utilized to implement RAID functionality, including RAID controller 460, map 462, FIFO queues 466, protocol translator 464 or native bus interfaces 470 may utilize a set of computer readable instructions of one or more ASICs such as the Silicon Image Si5723 Storage Processor.

From the above description, it will be noted that different RAID schemes may be implemented by RAID controller 460 to achieve different objectives. For example, RAID level 0 may be implemented to improve performance or improve storage capacity, RAID levels 1, 3, 4 5, or 6 may be implemented to provide some measure of fault tolerance or recovery (of course it will also be noted that the level of RAID implemented may depend at least partially on the number of secondary I/O buses 430 or storage media 440 coupled to these secondary I/O buses 430 are implemented with respect to the embodiment of the virtual translator storage device 410).

In addition to RAID functionality, other forms of functionality may be implemented with respect to embodiments of a virtual translator storage device. In one embodiment, this functionality may include performing encryption on the data stored on one or more of the storage media associated with the virtual translator storage device. Encrypting data in conjunction with an embodiment of the virtual translator storage device may increase performance of a system with which a virtual translator storage device is utilized (e.g. because no bandwidth is consumed by the operating system for encrypting and decrypting) while simultaneously eliminating a security risk (a compromised operating system or stored data). In a notebook computer setting encrypting at the device level is extremely important for removable storage devices as these devices may frequently be misplaced, stolen or otherwise accessed by unauthorized persons. In the same vein, embodiment of the virtual storage translation device may allow all data on a storage device to be fully encrypted (as opposed to the storage device containing a mix of encrypted and non-encrypted data). A fully encrypted drive provides a greater level of security than a drive that contains non-encrypted and encrypted data.

Figure 5:
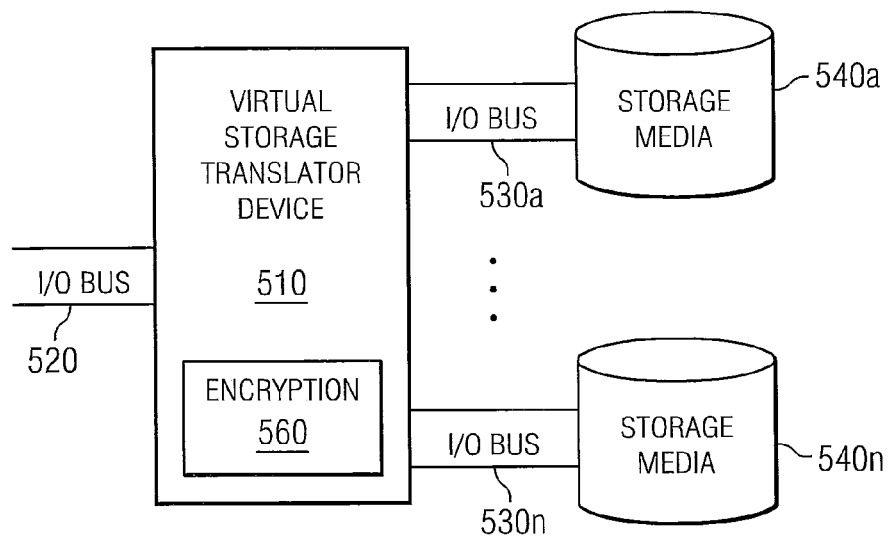
FIG. 5 is a block diagram of one embodiment of a virtual translator storage device.

Turning to FIG. 5, a block diagram for one embodiment of a system for interfacing multiple buses with a single bus is depicted, where encryption may be implemented with respect to data stored on one or more of the storage devices on these multiple buses. More specifically, virtual storage translator device 510 may allow a primary I/O bus 520 to be interfaced with multiple secondary I/O buses 530. Virtual storage translator device 510, includes encryption logic 560 which may be hardware (e.g. on an ASIC), a portion of the hardware or ASIC comprising virtual storage translator device 510, computer readable instructions on a computer readable media, or some combination. Encryption logic 560 may be operable to implement apply one or more encryption algorithms to data being stored to, or retrieved from, storage devices 540 to encrypt according to established standards such as SSL, it could provide low-level whole or partial encryption of a storage device, or it some other function involving an encryption algorithm. These encryption algorithms may include, but are not limited to, all or a subset of the following:

| SSL v3.0 cipher suites | | | | | |
|---|---|---|---|---|---|
| SSL v3.0 Cipher Suite /OpenSSL Name | Auth | Cipher | Key Length | Mode | Hash |
| SSL_RSA_EXPORT_WITH_RC4_40_MD5<br>EXP-RC4-MD5 | RSA | RC4 | 40 | — | MD5 |
| SSL_RSA_WITH_RC4_128_MD5<br>RC4-MD5 | RSA | RC4 | 128 | — | MD5 |
| SSL_RSA_WITH_RC4_128_SHA<br>RC4-SHA | RSA | RC4 | 128 | — | SHA-1 |
| SSL_RSA_EXPORT_WITH_RC2_CBC_40_MD5<br>EXP-RC2-CBC-MD5 | RSA | RC2 | 40 | CBC | MD5 |
| SSL_RSA_EXPORT_WITH_DES40_CBC_SHA<br>EXP-DES-CBC-SHA | RSA | DES | 40 | CBC | SHA-1 |
| SSL_RSA_WITH_DES_CBC_SHA<br>DES-CBC-SHA | RSA | DES | 56 | CBC | SHA-1 |
| SSL_RSA_WITH_3DES_EDE_CBC_SHA<br>DES-CBC3-SHA | RSA | 3DES | 168 | CBC | SHA-1 |
| SSL_DHE_DSS_EXPORT_WITH_DES40_CBC_SHA<br>EXP-EDH-DSS-DES-CBC-SHA | DSA | DES | 40 | CBC | SHA-1 |
| SSL_DHE_DSS_WITH_3DES_EDE_CBC_SHA | DSA | 3DES | 168 | CBC | SHA-1 |

-continued

SSL v3.0 cipher suites

| SSL v3.0 Cipher Suite /OpenSSL Name | Auth | Cipher | Key Length | Mode | Hash |
|---|---|---|---|---|---|
| EDH-DSS-DES-CBC3-SHA | | | | | |
| SSL_DHE_RSA_EXPORT_WITH_DES40_CBC_SHA<br>EXP-EDH-RSA-DES-CBC-SHA | RSA | DES | 40 | CBC | SHA-1 |
| SSL_DHE_RSA_WITH_DES_CBC_SHA<br>EDH-RSA-DES-CBC-SHA | RSA | DES | 56 | CBC | SHA-1 |
| SSL_DHE_RSA_WITH_3DES_EDE_CBC_SHA<br>EDH-RSA-DES-CBC3-SHA | RSA | 3DES | 168 | CBC | SHA-1 |

TLS v1.0 cipher suites

| TLS v1.0 Cipher Suite /☐OpenSSL Name | Auth | Cipher | Key Length | Mode | Hash |
|---|---|---|---|---|---|
| TLS_RSA_EXPORT_WITH_RC4_40_MD5<br>EXP-RC4-MD5 | RSA | RC4 | 40 | — | MD5 |
| TLS_RSA_WITH_RC4_128_MD5<br>RC4-MD5 | RSA | RC4 | 128 | — | MD5 |
| TLS_RSA_WITH_RC4_128_SHA<br>RC4-SHA | RSA | RC4 | 128 | — | SHA-1 |
| TLS_RSA_EXPORT_WITH_RC2_CBC_40_MD5<br>EXP-RC2-CBC-MD5 | RSA | RC2 | 40 | CBC | MD5 |
| TLS_RSA_EXPORT_WITH_DES40_CBC_SHA<br>EXP-DES-CBC-SHA | RSA | DES | 40 | CBC | SHA-1 |
| TLS_RSA_WITH_DES_CBC_SHA<br>DES-CBC-SHA | RSA | DES | 56 | CBC | SHA-1 |
| TLS_RSA_WITH_3DES_EDE_CBC_SHA<br>DES-CBC3-SHA | RSA | 3DES | 168 | CBC | SHA-1 |
| TLS_DHE_DSS_EXPORT_WITH_DES40_CBC_SHA<br>EXP-EDH-DSS-DES-CBC-SHA | DSA | DES | 40 | CBC | SHA-1 |
| TLS_DHE_DSS_WITH_3DES_EDE_CBC_SHA<br>EDH-DSS-DES-CBC3 SHA | DSA | 3DES | 168 | CBC | SHA-1 |
| TLS_DHE_RSA_EXPORT_WITH_DES40_CBC_SHA<br>EXP-EDH-RSA-DES-CBC-SHA | RSA | DES | 40 | CBC | SHA-1 |
| TLS_DHE_RSA_WITH_DES_CBC_SHA<br>EDH-RSA-DES-CBC-SHA | RSA | DES | 56 | CBC | SHA-1 |
| TLS_DHE_RSA_WITH_3DES_EDE_CBC_SHA<br>EDH-RSA-DES-CBC3-SHA | RSA | 3DES | 168 | CBC | SHA-1 |

AES cipher suites from RFC3268, extending TLS v1.0

| TLS v1.0 Cipher Suite /☐OpenSSL Name | Auth | Cipher | Key Length | Mode | Hash |
|---|---|---|---|---|---|
| TLS_RSA_WITH_AES_128_CBC_SHA<br>AES128-SHA | RSA | AES | 128 | CBC | SHA-1 |
| TLS_RSA_WITH_AES_256_CBC_SHA<br>AES256-SHA | RSA | AES | 256 | CBC | SHA-1 |
| TLS_DHE_DSS_WITH_AES_128_CBC_SHA<br>DHE-DSS-AES128-SHA | DSA | AES | 128 | CBC | SHA-1 |
| TLS_DHE_DSS_WITH_AES_256_CBC_SHA<br>DHE-DSS-AES256-SHA | DSA | AES | 256 | CBC | SHA-1 |
| TLS_DHE_RSA_WITH_AES_128_CBC_SHA<br>DHE-RSA-AES128-SHA | RSA | AES | 128 | CBC | SHA-1 |
| TLS_DHE_RSA_WITH_AES_256_CBC_SHA<br>DHE-RSA-AES256-SHA | RSA | AES | 256 | CBC | SHA-1 |

| Additional Export 1024 and other cipher suites | | | | | |
|---|---|---|---|---|---|
| TLS v1.0 Cipher Suite/☐OpenSSL Name | Auth | Cipher | Key Length | Mode | Hash |
| TLS_RSA_EXPORT1024_WITH_DES_CBC_SHA EXP1024-DES-CBC-SHA | RSA | DES | 56 | CBC | SHA-1 |
| TLS_RSA_EXPORT1024_WITH_RC4_56_SHA EXP1024-RC4-SHA | RSA | RC4 | 56 | — | SHA-1 |
| TLS_DHE_DSS_EXPORT1024_WITH_DES_CBC_SHA EXP1024-DHE-DSS-DES-CBC-SHA | DSA | DES | 56 | CBC | SHA-1 |
| TLS_DHE_DSS_EXPORT1024_WITH_RC4_56_SHA EXP1024-DHE-DSS-RC4-SHA | DSA | RC4 | 56 | — | SHA-1 |
| TLS_DHE_DSS_WITH_RC4_128_SHA DHE-DSS-RC4-SHA | DSA | RC4 | 128 | — | SHA-1 |

Note: these ciphers can also be used in SSL v3 among others.

| SSL v2.0 cipher suites | | | | | |
|---|---|---|---|---|---|
| TLS v1.0 Cipher Suite/☐OpenSSL Name | Auth | Cipher | Key Length | Mode | Hash |
| SSL_CK_RC4_128_WITH_MD5 RC4-MD5 | — | RC4 | 128 | — | MD5 |
| SSL_CK_RC4_128_EXPORT40_WITH_MD5 EXP-RC4-MD5 | — | RC4 | 128 | — | MD5 |
| SSL_CK_DES_64_CBC_WITH_MD5 DES-CBC-MD5 | — | DES | 64 | CBC | MD5 |
| SSL_CK_DES_192_EDE3_CBC_WITH_MD5 DES-CBC3-MD5 | — | 3DES | 192 | CBC | MD5 |

Encryption

In one embodiment, the following algorithms for encryption may be supported:

| Algorithm | Key Length | Encryption Mode |
|---|---|---|
| AES | 128 | CBC |
| 3DES | 168 | CBC |
| Blowfish | 128 | CBC |
| Cast | 128 | CBC |
| Arcfour (RC4) | 128 | — |
| AES | 192 | CBC |
| AES | 256 | CBC |

Authentication

In one embodiment, the following algorithms for authentication may be supported:

| Algorithm | Key Length | Encryption Mode |
|---|---|---|
| DSA | Any, defaults to 1024 | n/a - only used for authentication |
| RSA | Any, defaults to 1024 | n/a - only used for authentication |

Thus, virtual storage translator device 510 may be operable to receive commands or instructions on primary I/O bus 520 and translate these commands or instructions such that they are effectuated with respect to storage device 540 on secondary I/O buses 530. Additionally, virtual storage translator device 510 is operable to apply encryption logic 560 to any data being stored or retrieved from one or more of these storage devices 540, such that data may be stored on one or more storage device 540 in an encrypted format. As this encryption may take place in virtual storage translator device 510, the encryption process may be more secure than a similar encryption process which is accomplished at the operating system or application level.

As a large degree of functionality has been discussed herein in conjunction with embodiments of a virtual translator storage device it should be pointed out that almost any permutation of embodiments of functionalities discussed herein may be implemented. For example, multiple virtual translator storage devices may be cascaded to achieve varying effects, RAID may be implemented with respect to none or all of the virtual translator storage devices in a particular system, different types of storage devices may be utilized in conjunction with virtual translator storage devices, RAID may be implemented with varying types of storage devices and hardware encryption may be utilized on one or more of these storage devices, etc.

Figure 6:
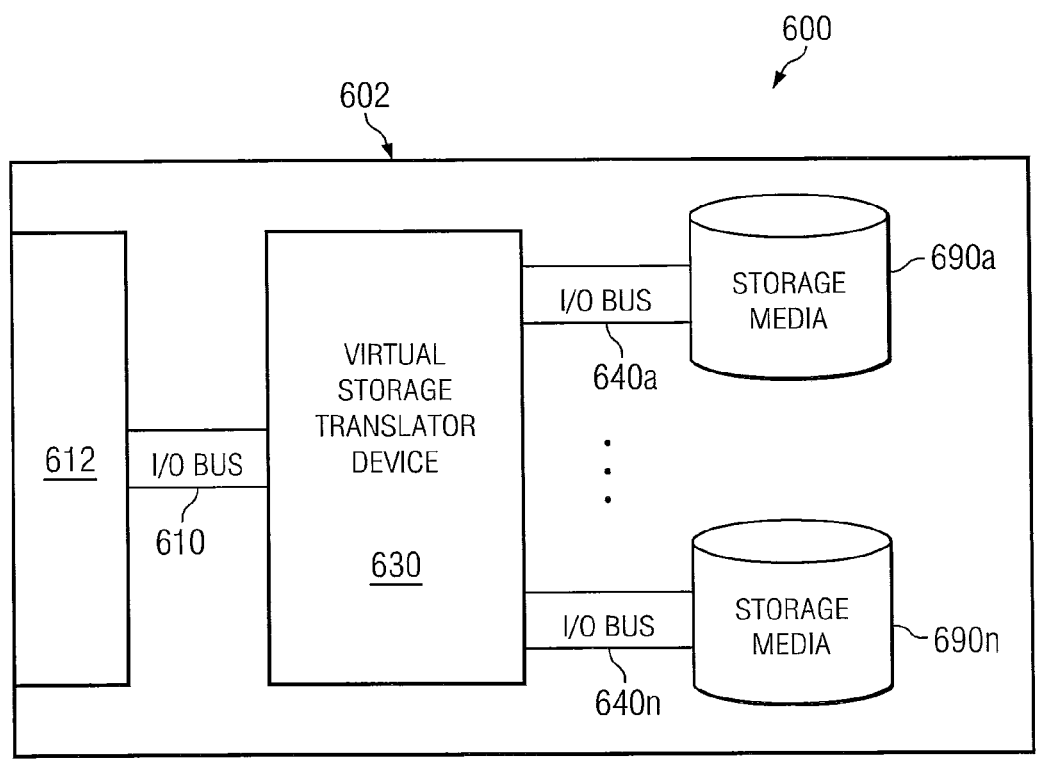
FIG. 6 is a block diagram of one embodiment of a storage device utilizing an embodiment of a virtual translator storage device.

Thus, embodiments of the virtual translator storage device may be employed in storage devices to a variety of advantageous ends. Such storage device may be better understood with reference to FIG. 6 which depicts a block diagram of one embodiment of a storage device which employs a virtual storage translator device. Storage device 600 may be housed in an enclosure 602, which may be an enclosure which conforms to any one of a number of industry standards or which may be a proprietary enclosure designed for use with a particular manufacture's computing systems, etc. The enclosure 602 may house or otherwise comprise an interface 612 operable to couple storage device 600 to a bus such as SATA, PATA, SCSI, PCI or any other type of bus or medium over which commands may be received and responses sent. Virtual storage translator device 630 is coupled to interface 612 through I/O bus 610 such that commands received at interface 612 will be passed to virtual storage translator device 630 on I/O bus 610. It will also be noted that virtual storage translator device 630 may itself comprise interface 612 (for example virtual storage translator device 630 may a card or printed circuit board comprising interface 612), such that I/O bus 610 may not be needed and virtual storage translator device 630 may receive commands from or through interface 612 on the bus to which interface 612 is coupled.

Virtual translator storage device 630 is, in turn, coupled to each of storage media 690 using a corresponding I/O bus 640, which may be a SATA, PATA or other type of bus, including a proprietary bus designed for use with virtual storage translator device 630. Storage media 690 may each be solid state storage (e.g. flash or DRAM-based solid state storage) or may each comprise one or more disk platters, heads and arms as are known in the art, or may be another type of storage media altogether.

Virtual translator storage device 670 may execute the commands received through interface 612 utilizing storage media 690. In other words, in this embodiment, two storage media 690 may be utilized in conjunction with a single interface of a single storage device without altering the BIOS or other software issuing commands over interface 612. In fact, to the issuer of commands through interface 612 it appears as if a single storage device (e.g. hard disk drive, etc.) is present at interface 612. Thus, a wide variety of different objectives may be accomplished using virtual storage translator device 630. For example, if virtual storage translator device 630 implements RAID level 0 with respect to storage media 690, storage capacity of storage device 600 may effectively be doubled without any alteration to the hardware or software used to interface with the storage device 600 (e.g. relative to a single storage device with a single storage media). In other words, no matter the size of a single storage device using a single storage media which can be coupled to a particular interface or bus, this size can be effectively doubled (or tripled, quadrupled, etc.) by utilizing storage device 600 with multiple storage media 640.

Additionally, certain levels of fault tolerance or recoverability may be achieved without alteration to the BIOS or other software issuing commands by using virtual storage translator device 630 to implement higher levels of RAID (e.g. RAID level 1, 5, etc.) with respect to the multiple storage media 640 of storage device 600 as discussed above. Similarly, encryption may also be achieved without alteration to the BIOS or other software issuing commands by implementing this encryption with respect to virtual storage translator device 630 as also described above.

It should be noted that a wide variety of objectives may be accomplished through the use of embodiments of storage device 600 comprising virtual translator storage devices 630 (e.g. increased speed, performance, redundancy, etc.) and that many permutations of various RAID implementations and/or encryption implementations may be possible. For example, no RAID may be implemented with respect to storage media 640, RAID level 0 may be implemented with respect to storage media 640, encryption may be implemented with respect to one or more of storage media 640 on which RAID is implemented, etc.

Figure 7:
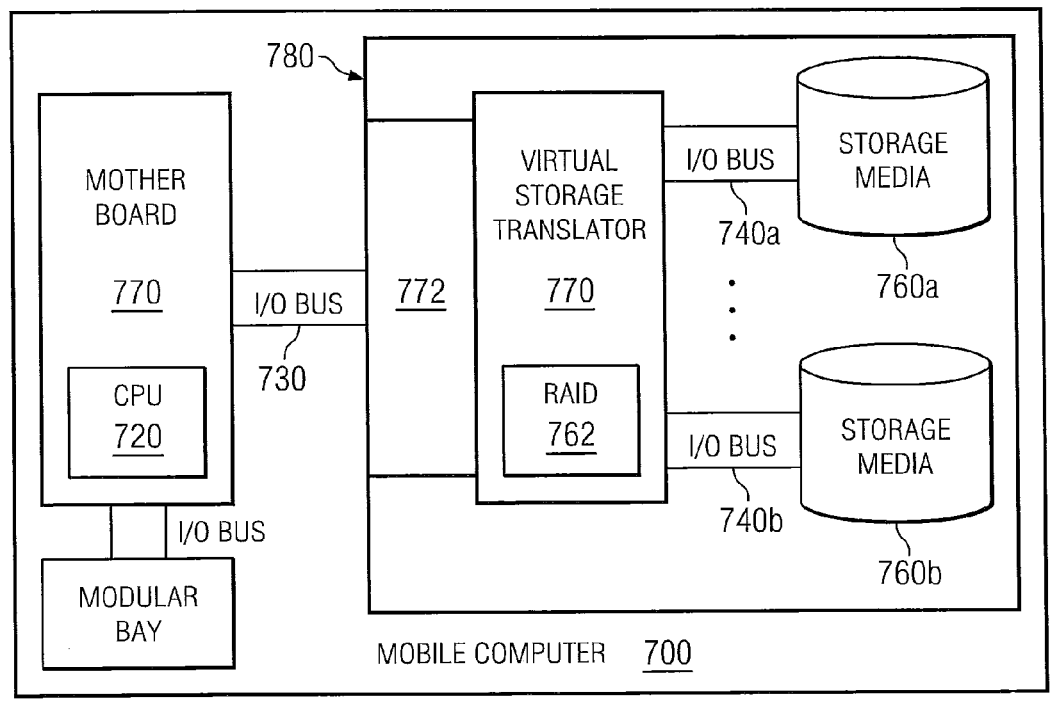
FIG. 7 is a block diagram of one embodiment of a use of a storage device utilizing an embodiment of a virtual translator storage device.

The functionality of an embodiment of storage device such as those discussed above may be better depicted with reference to FIG. 7 which depicts a block diagram of the use of just such an embodiment of a storage device utilizing a virtual storage translator device having a RAID controller in a mobile computing environment. Mobile computer 700 comprises a mother board 710 with a Central Processing Unit (CPU) 720 where the mother board is coupled to storage device 780 through an I/O bus 730, such as a SATA or other type of bus. Storage device 780 comprises virtual translator storage device 770 having interface 772 operable to interface with I/O bus 730. Virtual translator storage device 770 is, in turn, coupled to each of storage media 760 using a corresponding I/O bus 740, which may also be SATA or other type of bus.

Virtual translator storage device 770 comprises RAID controller 762 such that RAID may be implemented with respect to commands received on primary I/O bus 730 utilizing storage media 760. In other words, in this embodiment, RAID may be implemented by RAID controller 762 with respect to two storage media 760 in conjunction with an I/O bus 730 designed to interface with only a single storage device without altering the BIOS or other software executing in conjunction with the mobile computer 700. In fact, to an operating system or other software executing on mobile computer 700 (e.g. executing on CPU of mother board 710) it may appear as if a single storage device with a single storage media (e.g. hard disk drive, etc.) is present on I/O bus 730.

As can be seen then, by using storage device 780 RAID may be implemented to accomplish various objectives (increase speed or performance, redundancy, fault tolerance, etc.) without any alteration to the hardware or software of mobile computer 700 (e.g. alteration to the BIOS, operating system, drivers, etc.). It will be apparent after a review of the above that though one embodiment of the storage device has been depicted with respect to a mobile computer, embodiments of such storage devices may be similarly utilized with equal efficacy in other setting (e.g. other types of computing or data storage systems).

Figure 8:
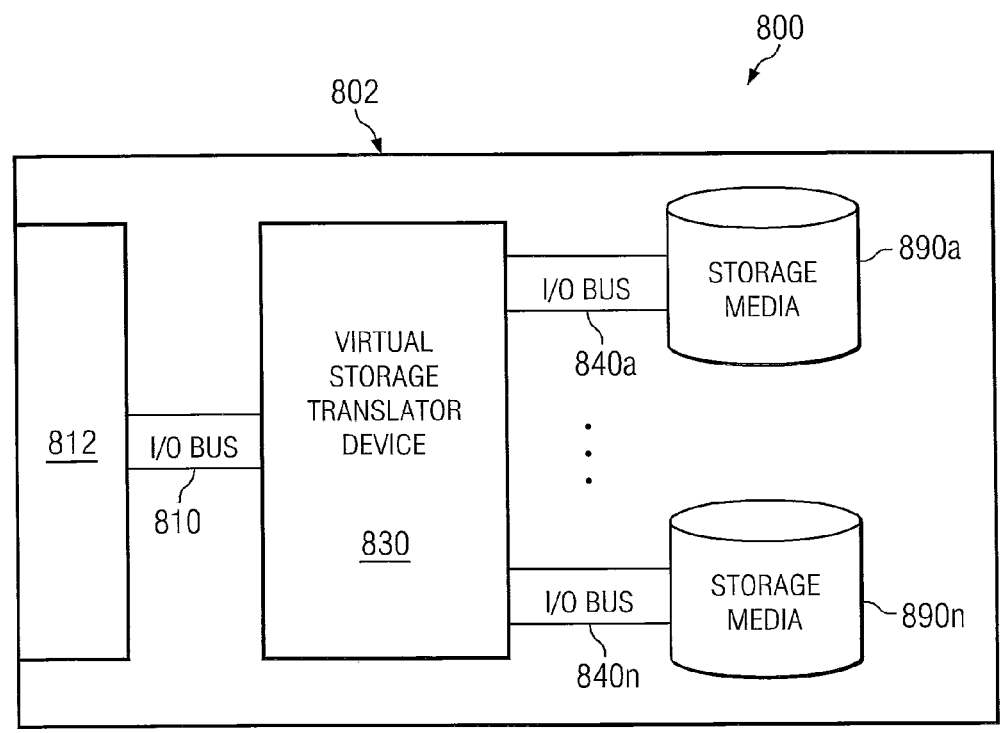
FIG. 8 is a diagrammatic representation of one embodiment of a storage device utilizing an embodiment of a virtual translator storage device.

FIG. 8 depicts a block diagram of one embodiment of a storage device which employs a virtual storage translator device which may, for example, be used in a storage server (or other storage) setting. Storage device 800 may be housed in an enclosure 802, which may be an enclosure which may be a proprietary enclosure designed for use with a particular manufacture's computing systems (e.g. to fit in a slot in manufacturer's storage server), etc. The enclosure 802 may house an interface 812 operable to couple storage device 800 to a bus such as SATA, RATA, SCSI, PCI or any other type of bus or medium over which commands may be received and responses sent, including those buses or mediums proprietary to a particular manufacturer's computing systems, etc. Virtual storage translator device 830 is coupled to interface 812 through I/O bus 810 such that commands received at interface 812 will be passed to virtual storage translator device 830 on I/O bus 810. It will also be noted that virtual storage translator device 830 may itself comprise interface 812 (for example virtual storage translator device 830 may a card or printed circuit board comprising interface 812), such that I/O bus 810 may not be needed and virtual storage translator device 830 may receive commands from through interface 812 on the bus to which interface 812 is coupled.

Virtual translator storage device 830 is, in turn, coupled to each of storage media 890 using a corresponding I/O bus 840, which may be a SATA, PATA or other type of bus, including a proprietary bus designed for use with virtual storage translator device 830. Storage media 890 may each be solid state storage (e.g. flash or DRAM-based solid state storage) or may each comprise one or more hard disks produced by a manufacturers such as those made by Seagate, Western Digital, Maxtor, Hitachi, etc.

Virtual translator storage device 870 may execute the commands received through interface 812 utilizing storage media 890. In other words, in this embodiment, two storage media 890 may be utilized in conjunction with a single interface of a single storage device without altering the BIOS or other software issuing commands over interface 812. In fact, to the issuer of commands through interface 812 it appears as if a single storage device (e.g. hard disk drive, etc.) is being accessed through interface 812. Thus, a wide variety of different objectives may be accomplished using virtual storage translator device 830. For example, if virtual storage translator device 830 implements RAID level 0 with respect to storage media 890, storage capacity of storage device 800 may effectively be doubled without any alteration to the hardware or software used to interface with the storage device 800 (e.g. relative to a single storage device with a single storage media). In other words, no matter the size of a single storage device using a single storage media which can be coupled to a particular interface or bus, this size can be effectively doubled (or tripled, quadrupled, etc.) by utilizing storage device 800 with multiple storage media 840.

Figure 9:
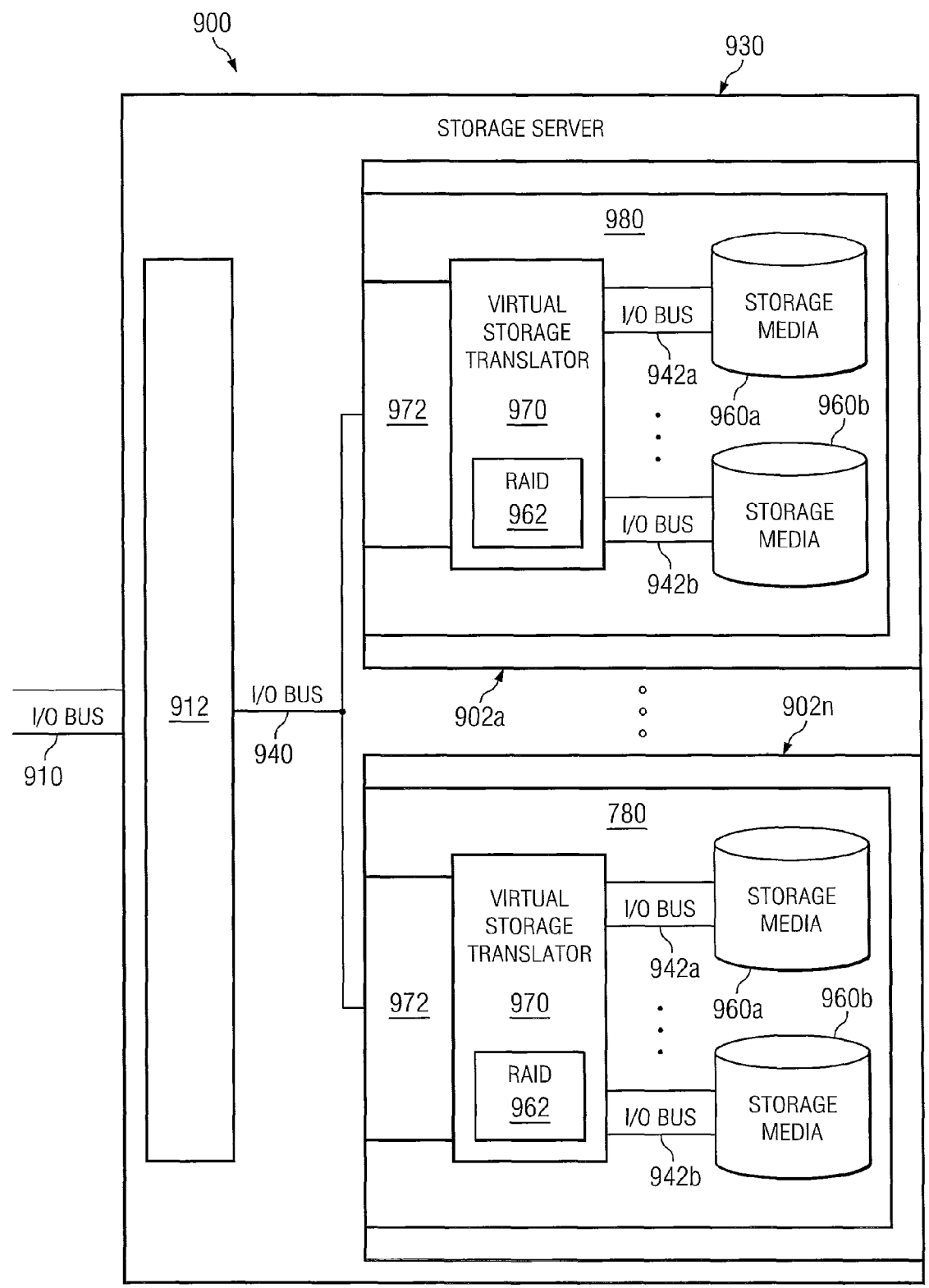
FIG. 9 is a block diagram of one embodiment of a use of a storage device utilizing an embodiment of a virtual translator storage device.

The functionality of an embodiment of storage device such as those discussed above may be better depicted with reference to FIG. 9 which depicts a block diagram of the use of just such an embodiment of a storage device utilizing a virtual storage translator device having a RAID controller in a storage server environment.

Storage system 900 comprises a storage server 930 which receives commands or instructions from one or more hosts (not shown) over I/O Bus 910, which may be a serial or other type of bus. Application(s) or hardware (collectively 812) which implement one or more storage server applications may process the received commands to determine one or more corresponding commands to be issued over one or more I/O buses 840. I/O bus 840 is operable to interface with a plurality of storage slots 902, each of the storage slots 902 itself operable to interface with a storage device where, as described above, the size, interface or other properties of slots 902 may be proprietary to the manufacturer of storage server 930.

Each storage device 980 utilized in conjunction with a storage slot 902 (e.g. plugged into or otherwise interfaced with the storage slot 902) may therefore utilize an enclosure designed for use with that slot 902. In other words, the physical or other attributes of the enclosure (or other portions of) storage device 980 may be configure to function in conjunction with storage slot 902 (or storage server 930). Storage device 980 also comprises virtual translator storage device 970 having interface 972 operable to interface with I/O bus 840. Virtual translator storage device 970 is, in turn, coupled to each of storage media 960 using a corresponding I/O bus 942, which may also be SATA or other type of bus. Virtual translator storage device 970 comprises RAID controller 962 such that RAID may be implemented with respect to commands received on I/O bus 940 utilizing storage media 960. In other words, in this embodiment, RAID may be implemented by RAID controller 962 with respect to two storage media 960 in conjunction with an I/O bus 840 designed to interface with only a single storage device without altering the BIOS or other applications (e.g. storage server applications, operating system, drivers, etc.) executing in conjunction with the storage server 930. In fact, to an operating system or other software executing on storage server 930 it may appear as if a single storage device with a single storage media (e.g. hard disk drive, etc.) is present in slot 902.

As can be seen then, by using storage device 980 RAID may be implemented with respect to one or more storage device in slots 902 to accomplish various objectives (increase speed or performance, redundancy, fault tolerance, etc.) without any alteration to the hardware or software of storage server 930 (e.g. alteration to the BIOS, operating system, drivers, storage or other applications, etc.).

It should be noted that a wide variety of objectives may be accomplished through the use of embodiments of storage device 980 comprising virtual translator storage devices 970 (e.g. increased speed, performance, redundancy, etc.) and that many permutations of various RAID implementations and/or encryption implementations may be possible. For example, no RAID may be implemented with respect to storage media 960, RAID level 0 may be implemented with respect to storage media 960, encryption may be implemented with respect to one or more of storage media 960 on which RAID is implemented, etc.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. For example, it will be noted that many other permutations of use of embodiments of a virtual translator storage device may be implemented.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A storage device, comprising:
an enclosure including a processor;
a first interface operable to interface with a first I/O bus and receive a first command for storing data utilizing a first protocol, wherein the storage device appears as a single storage device on the first I/O bus;
a second interface operable to interface with a plurality of second I/O buses to store the data corresponding to the first command, a first I/O bus of the plurality of second I/O buses utilizing a second protocol associated with a first type of storage media selected for non-critical data storage and a second I/O bus of the plurality of second I/O buses utilizing a third protocol associated with a second type of storage media selected for critical data storage and different from the second protocol, each of the plurality of second I/O buses coupled to one or more storage media; and
a controller comprising a memory for storing a set of instructions executable by the processor to determine a type of storage media into which the data is to be stored;
a plurality of queues operable to buffer the first command received through the first interface, wherein a first set of queues is configured to buffer commands associated with the first type of storage media and a second set of queues is configured to buffer commands associated with the second type of storage media;
a map operable to map an address for the first command received on the first I/O bus to one or more physical addresses corresponding to the one or more storage media coupled to the second I/O buses associated with the type of storage media into which the data is to be stored; and
a translator operable to configure a communication in the first protocol, the second protocol or the third protocol, wherein the controller is operable to store the data on the one or more storage media coupled to the plurality of second I/O buses and to implement a level of RAID in conjunction with two or more storage media coupled to the plurality of second I/O buses by buffering the first command in the first set of queues or the second set of queues based on the determination that the data is non-critical or critical and translating the first command to one or more second commands according to the second protocol or the third protocol to implement the first command in conjunction with the level of RAID.

2. The storage device of claim 1, wherein each of the corresponding storage media are disk platters, solid state storage media or disk drives.

3. The storage device of claim 2, wherein the enclosure comprises the first interface, the plurality of second I/O buses, the corresponding storage media and the controller.

4. The storage device of claim 3, wherein the enclosure is an industry standard size.

5. The storage device of claim 3, wherein the enclosure is a proprietary size.

6. The storage device of claim 3, wherein the first I/O bus is a SATA, PATA, SCSI, or FC bus.

7. The storage device of claim 6, wherein the plurality of second I/O buses are SATA, PATA, SCSI, or FC buses.

8. The storage device of claim 3, further comprising encryption logic operable to implement one or more encryption algorithms to data being stored in, or retrieved from one or more of the one or more storage media.

9. The storage device of claim 1, wherein the RAID level is level 1, 3, 4, 5, 6 or 10.

10. The storage device of claim 1, wherein the storage device is further operable to implement multi-RAID modes and cascaded storage media.

11. A method for implementing a storage device having an enclosure with a processor and a non-transitory computer-readable medium storing a set of instructions executable for:
receiving a first command through a first interface of the storage device operable to interface with a first I/O bus utilizing a first protocol, wherein the storage device comprises a plurality of second I/O buses including a first I/O bus of the plurality of second I/O buses utilizing a second protocol associated with a first type of storage media selected for non-critical data storage and a second bus of the plurality of second I/O buses utilizing a third protocol associated with a second type of storage media selected for critical data storage and different from the second protocol, wherein each I/O bus of the plurality of second I/O buses is operable to couple to one or more storage media;
determining a type of storage media into which the data is to be stored,
buffering the first command in one or more of a plurality of queues, wherein a first set of queues is configured to buffer commands associated with the first type of storage media and a second set of queues is configured to buffer commands associated with the second type of storage media;
mapping an address for the first command received on the first I/O bus to one or more addresses corresponding to the one or more storage media coupled to the second I/O buses;
translating the first command to one or more second commands according to the second protocol or the third protocol;
storing the data in the one or more storage media, wherein the storage device is operable to map an address for the first command received on the first I/O bus to one or more physical addresses corresponding to the first type of storage media coupled to the first I/O bus of the plurality of second I/O buses or the second type of storage media coupled to the second I/O bus of the plurality of second I/O buses such that the storage device appears as a single storage device on the first I/O bus; and
implementing a level of RAID in conjunction with two or more storage media coupled to the plurality of second I/O buses by buffering the first command received through the first interface in one queue of the first set of queues or the second set of queues based on the determination that the data is non-critical or critical and translating the first command received on the first I/O bus to one or more second commands according to the second protocol or the third protocol to implement the first command in conjunction with the level of RAID.

12. The method of claim 11, wherein each of the storage media are disk platters, solid state storage media or disk drives.

13. The method of claim 12, wherein the enclosure is an industry standard size.

14. The method of claim 12, wherein the enclosure is a proprietary size.

15. The method of claim 12, wherein the controller is configured to implement the first command in conjunction with a level of RAID.

16. The method of claim 12, wherein the RAID level is level 1, 3, 4, 5, 6 or 10.

17. The method of claim 12, further comprising implementing multi-RAID modes and cascaded storage devices.

18. The method of claim 12, wherein the first I/O bus is a SATA, PATA, SCSI, or FC bus.

19. The method of claim 12, wherein each of the plurality of second I/O buses is a SATA, PATA, SCSI, or FC bus.

20. The method of claim 12, further comprising encrypting data being stored in, or retrieved from one or more of the one or more storage media.

* * * * *